US009521733B2

(12) United States Patent
Brand et al.

(10) Patent No.: US 9,521,733 B2
(45) Date of Patent: Dec. 13, 2016

(54) DUAL-MODE LUMINAIRE CONTROLLERS

(71) Applicant: SCHREDER, Brussels (BE)

(72) Inventors: Daniel Brand, Cologne (DE); Helmut Schroeder, Wiesbaden (DE); Raoul Van Bergen, Cologne (DE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 14/779,609

(22) PCT Filed: Mar. 27, 2013

(86) PCT No.: PCT/EP2013/056634
§ 371 (c)(1),
(2) Date: Sep. 24, 2015

(87) PCT Pub. No.: WO2014/154274
PCT Pub. Date: Oct. 2, 2014

(65) Prior Publication Data
US 2016/0057837 A1    Feb. 25, 2016

(51) Int. Cl.
| G05F 1/00 | (2006.01) |
| H05B 37/02 | (2006.01) |
| H05B 39/04 | (2006.01) |
| H05B 41/36 | (2006.01) |
| H05B 41/298 | (2006.01) |
| H05B 41/392 | (2006.01) |

(52) U.S. Cl.
CPC ...... *H05B 37/0272* (2013.01); *H05B 37/0218* (2013.01); *H05B 41/2981* (2013.01); *H05B 41/3921* (2013.01)

(58) Field of Classification Search
None
See application file for complete search history.

(56) References Cited

U.S. PATENT DOCUMENTS

| 6,181,086 B1 | 1/2001 | Katyl et al. | |
| 2010/0181935 A1* | 7/2010 | Wu | H05B 41/3921 315/307 |
| 2012/0133298 A1* | 5/2012 | Campbell | H05B 33/0833 315/250 |

(Continued)

FOREIGN PATENT DOCUMENTS

| WO | WO2012176097 A1 | 12/2012 | |
| WO | WO 2012176097 A1 * | 12/2012 | ......... H05B 37/0245 |

OTHER PUBLICATIONS

ISA/EP International Search Report issued Feb. 21, 2014 re PCT Application No. PCT/EP2013/056634, filed Mar. 27, 2013.

*Primary Examiner* — Anh Tran
(74) *Attorney, Agent, or Firm* — Patrick J. Daugherty; Driggs, Hogg, Daugherty & Del Zoppo Co., LPA

(57) ABSTRACT

Described herein is a dual-mode luminaire controller for a luminaire in which dimming signals can be provided to control the operation of the luminaire using signals in accordance with either '0-10V' or DALI protocols. The controller includes a central processing module, an isolated supply in which both a DALI interface and a '0-10V' interface are provided. The luminaire controller also includes a ZigBee transceiver module through which signals can be provided for selecting one of the interfaces in accordance with the operating protocol of the luminaire with which the luminaire controller is associated.

19 Claims, 1 Drawing Sheet

(56) References Cited

U.S. PATENT DOCUMENTS

2013/0200807 A1* 8/2013 Mohan .................. H05B 37/02
                                                            315/151
2013/0320875 A1* 12/2013 Saes .................. H05B 33/0818
                                                            315/224

* cited by examiner

DUAL-MODE LUMINAIRE CONTROLLERS

FIELD OF THE INVENTION

The present invention relates to dual-mode luminaire controllers.

BACKGROUND TO THE INVENTION

Luminaires are controlled by luminaire controllers which are either mounted directly on the luminaire or are mounted on an interface receptacle provided on the luminaire. Such luminaire controllers tend to be implemented as either an analogue-controlled system using '0-10V' protocol or a digitally-controlled system using digital addressable lighting interface (DALI) protocol for controlling dimming of associated luminaires and do not have the capability of being configured for operation either as an analogue-controlled system or as a digitally-controlled system when mounted on a luminaire due to the configuration of the luminaire. This is particularly the case where an interface receptacle is provided on the luminaire for receiving a luminaire controller as each interface receptacle is configured for either analogue ('0-10V') or digital (DALI) operation. This means that the correct type of luminaire controller needs to provided to meet the operational requirements of the luminaire and/or its associated interface receptacle in terms of polarity and for the prevention of miswiring.

U.S. Pat. No. 8,072,164 discloses a unified '0-10V' and DALI dimming interface circuit for a ballast for dimming a lighting device. The unified dimming circuit is designed to be compatible with the polarity of connections within the ballast so that it is not damaged by miswired connections. In particular, the disclosed unified interface circuit includes an isolating inverter circuit coupled to both a voltage regulator and a current regulator, and a depolarising circuit to ensure that the correct polarity is provided to a rectifier circuit inductively-coupled to the isolating inverter circuit.

SUMMARY OF THE INVENTION

It is therefore an object of the present invention to provide a luminaire controller having the ability to operate with a luminaire irrespective of whether it is configured with an analogue (0-10V') or a digital (DALI) control system without having to be concerned about miswiring or polarity.

In accordance with a first aspect of the present invention, there is provided a luminaire controller connectable to a luminaire, the luminaire controller comprising:
  a main power connection;
  a central processing module; and
  an isolated supply connected to the main power connection and to the central processing module, the isolated supply being operable for providing dimming signals to the luminaire;
  characterised in that the isolated supply comprises both a digital addressable lighting interface and a '0-10V' interface, and in that the central processing module is operable to configure one of the interfaces for supplying the dimming signals to the luminaire in accordance with the mode of operation of the luminaire.

By having an isolated supply having both a digital addressable lighting (DALI) interface and a '0-10V' interface for providing dimming control signals, the luminaire controller is readily adaptable to any type of luminaire having dimming capability without having to be concerned about miswiring or polarity. The selection of the type of interface for dimming control is determined in accordance with the protocol used by the luminaire, that is, either digital or analogue.

Advantageously, the luminaire controller may further comprise a communications module connected to the central processing module. By having such a module, remote selection of the interface type for dimming control is provided.

The luminaire controller may further comprising a service link connected to the central processing module, the service link being adapted to receive signals to at least override the configuration of the interfaces.

A service link interface may be provided for the service link to ensure that signals transmitted over the service link are compatible with the central processing module and maintain galvanic isolation of a microprocessor within the central processing module.

In one embodiment, the service link may be adapted to select manually one of the interfaces. In another embodiment, the service link may be adapted to set manually the dimming levels. In a further embodiment, the service link may be adapted to receive system updates.

By having a multi-functional service link, the central processing module can be updated and the operation thereof adjusted in accordance with particular circumstances.

The luminaire controller may further comprising an energy metering module for measuring energy used by at least the luminaire. In one embodiment, the energy used by the luminaire controller itself can be determined.

In addition, a sensor module may be provided in the luminaire controller for determining ambient conditions. This has the advantage that changes in ambient conditions can be detected and used by the central processing module to operate the luminaire more effectively and efficiently.

In accordance with a second aspect of the present invention, there is provided a luminaire comprising a luminaire controller as described above.

In accordance with a further aspect of the present invention, there is provided a method of configuring a luminaire controller for dimming functionality, the luminaire controller comprising a mains power connection, a central processing module, and an isolated supply connected to the mains power connection and to the central processing module, the isolated supply including both a digital addressable lighting interface and a '0-10V' interface, the method comprising the steps of:
  a) supplying a configuration signal to the central processing module; and
  b) selecting one of the interfaces in accordance with a selection signal from the central processing module.

The configuration signal may be supplied to the central processing module via a communications system.

An override signal may be provided to central processing module via a service link so as to at least override the configuration of the interfaces. The override signal may be used for manually selecting each interface and/or manually setting dimming levels.

System updates may be provided via the service link.

In one embodiment, the configuration signal to the central processing module may be provided via a service link connected to the central processing module.

Steps a) and b) may be performed either after or before installation of the luminaire controller on a luminaire.

BRIEF DESCRIPTION OF THE DRAWINGS

For a better understanding of the present invention, reference will now be made, by way of example only, to the accompanying drawing in which.

DESCRIPTION OF THE INVENTION

Figure 1:
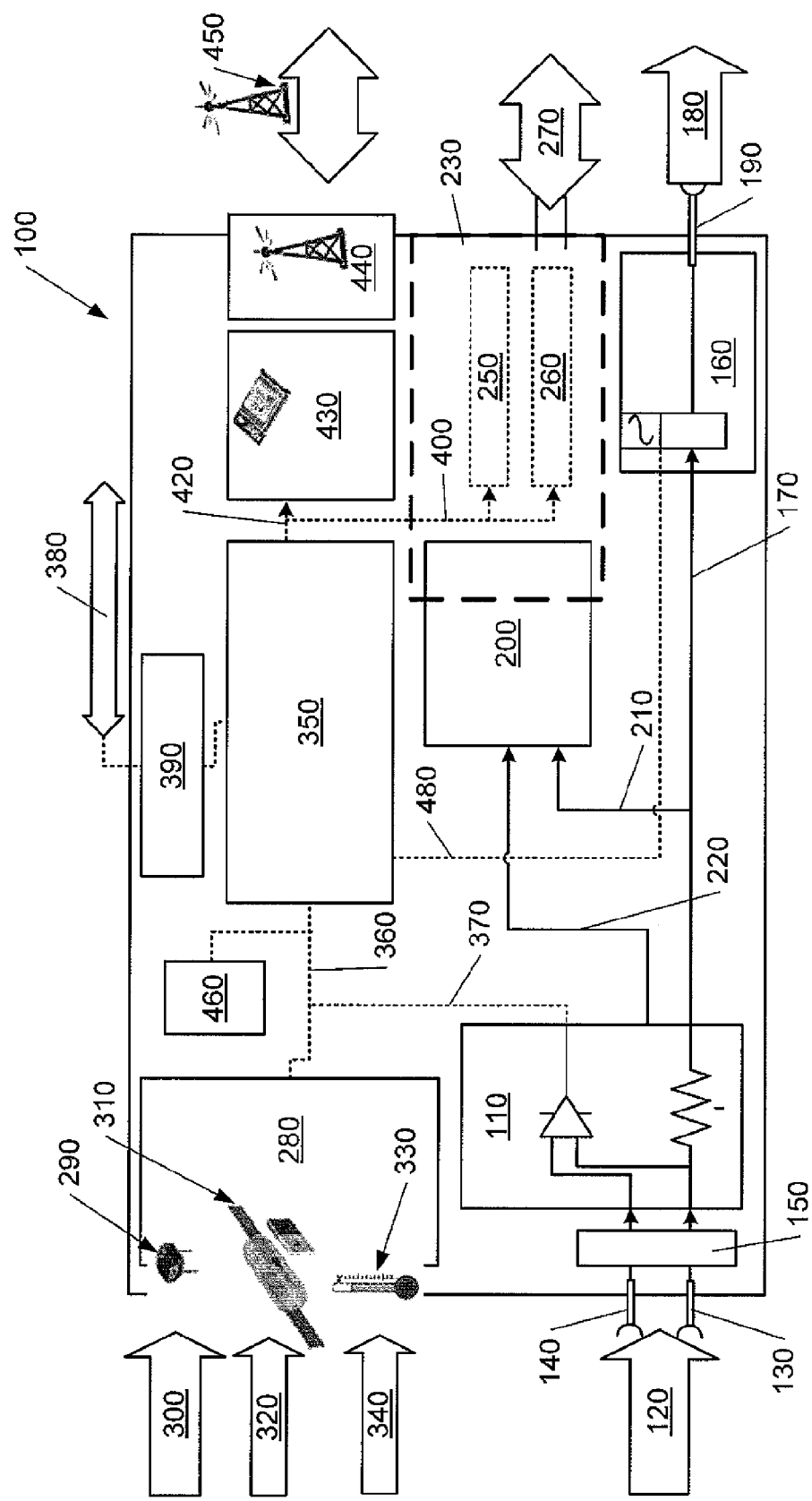
FIG. 1 illustrates a schematic block diagram of the components in a luminaire controller in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Luminaires are well-known for lighting large areas and can be used, for example, in street lighting applications. Each luminaire comprises a plurality of light-emitting diode (LED) elements and at least one driver circuit for controlling the operation of the LEDs. The LED driver circuits may be controlled to switch the driver circuit OFF completely during the day if there is a switch provided ahead of the driver circuit. This may be implemented using a switching relay that includes a ZigBee interface switching mains power and has the required level of isolation.

ZigBee is a trademark of the ZigBee Alliance which provides a specification for a suite of high level communication protocols using small, low-power digital radios based on an IEEE 802 standard for personal area networks. ZigBee is particularly useful in radio frequency (RF) applications where low data rates, long battery life and secure networking are required, and where periodic or intermittent data transmission or a single signal transmission is required from a sensor or other input device.

Another way of controlling the LED driver circuits is to use a '0-10V' input or digital addressable lighting interface (DALI) input. In this case, the output current of the driver circuit is set to 0 when it is desired that the associated luminaire is switched OFF. Nevertheless, there is always a remaining quiescent current that can vary from one driver circuit to another.

DALI is a technical standard for network-based systems for controlling lighting in buildings. It was established as a successor to '0-10V' lighting control systems, but both systems are still currently used. DALI is an open standard which is an alternative to digital signal interface (DSI) on which it is based. The DALI standard also incorporates a communications protocol and electrical interface for lighting control networks.

A conventional DALI network comprises a controller and one or more lighting devices, for example, electrical ballasts and dimmers, each lighting device having a DALI interface. The controller monitors and controls each lighting device by means of a bi-directional data connection. The DALI protocol allows lighting devices to be individually addressed as well as to be addressed in groups.

In a DALI network, each lighting device is assigned a unique static address in the numeric range from 0 to 63 making it possible to have 64 devices in a standalone system. Alternatively, DALI can be used as a subsystem via DALI gateways to address more than 64 devices. Data is transferred between the controller and each device by means of an asynchronous, half-duplex, serial protocol over a two-wire differential bus with a fixed data transfer rate, typically of 1200 bits per second. The network may be arranged in a bus or star topology or a combination thereof. As the DALI system is not classified as being separated extra low voltage (SELV), it can be run next to mains cables or within a multi-core cable that includes mains power. Data is transmitted using Manchester encoding (also known as phase encoding) and has a high signal-to-noise ratio which enables reliable communication in the presence of a large amount of electrical noise.

FIG. 1 illustrates a block diagram of a luminaire controller 100 in accordance with the present invention. The luminaire controller 100 comprises an energy measurement module 110 connected to a mains supply 120 via a live (L) line 130 and a neutral (N) line 140 and a surge protection circuit 150. The surge protection circuit 150 prevents damage to components within the luminaire controller 100 in the case of a spike in the mains supply 120.

The energy measurement module 110 is electrically connected to a power switch module 160 on line 170, the power switch module 160 switching power to load 180 via line 190. In this case, the load 180 comprises a luminaire (not shown).

An internal power supply module 200 is electrically connected to line 170 via a connecting line 210. The internal power supply module 200 is also connected to the energy measurement module 110 via a connecting line 220.

Associated with the internal power supply module 200 is an isolated supply 230 which provides proper isolation in accordance with local requirements. The isolated supply 230 includes functionality for either DALI control 250 or a '0-10V' control 260, that is, digital or analogue dimming control for a luminaire (not shown) on which the luminaire controller 100 is mounted. A dimming signal 270 is provided as an output of the isolated supply 230 for the luminaire (not shown), the dimming signal being between 0% and 100%.

A sensor module 280 is provided and comprises a photocell 290 for sensing ambient or environmental light levels 300, a reed switch/magnet arrangement 310 connected to a service switch 320, and a temperature sensor 330 for sensing ambient or environmental temperature levels 340. It will be appreciated that the elements in the sensor module 280 are shown as schematic illustrations and may be implemented in any appropriate form.

A central processing module 350 is connected to receive output signals from both the sensor module 280 via a data transfer line 360, and the energy measurement module 110 via a data transfer line 370. The central processing module 350 comprises central processing functions which include: switching and dimming logic; measurement and control configuration logic; and calibration logic. A service link 380 is connected to the central processing module 350 via a service link interface 390.

As shown, the central processing module 350 is connected to provide control signals to the isolated supply 230 via data transfer line 400 and also to a transceiver 430 via data transfer line 420. The transceiver 430 comprises an RF ZigBee transceiver and is connected to a ZigBee antenna 440. The ZigBee transceiver 430 wirelessly interacts with other ZigBee-configured transceivers 450. It will be appreciated that although only one other ZigBee transceiver 450 is shown, this is representative of a ZigBee wireless network.

In addition, a real-time clock (RTC) 460 is provided and is connected to the central processing module 350 as shown. The central processing module 350 is also connected to the power switch 160 via a data transfer line 480.

Referring now to the elements of the sensor module 310 in more detail, the photocell 290 detects dawn and dusk conditions as well as low light situations and has an adjustable trip point with hysteresis; the reed switch/magnet arrangement 310 provides a non-invasive method of initialising the luminaire controller including providing a way of providing firmware updates, diagnostics and calibration as well as a metering calibration check using blinking LEDs;

and the temperature sensor 330 measures the temperature inside the housing so that it can protect the electronics from excessive temperatures and provide temperature compensation corrections for the energy measurement module 110 to the central processing module 350.

The energy measurement module 110 provides 1% accuracy for energy billing over a range of 0.1 VA to 1500 VA with zero crossing detection of mains voltage and current. In addition, the energy measurement module 110 has low power consumption.

The RTC 460 is accurate and stable providing an accuracy levels better than 5 seconds in each 24 hours or 1 minute in each week. Ideally, the RTC 460 keeps time for more than 72 hours when no power is applied. It requires no maintenance.

The internal power supply module 200 has a multi-range input, typically between 90 to 300 Vac, and provides a DC output at 3.3V and 500 mA. For the isolated supply 230, a voltage of between 18 to 20V at 25 mA is provided with non-regulated ripple which is less than 200 mV. The internal power supply module 200 is efficient in that its total power consumption is less than 0.3 W.

The power switch 160 has a maximum continuous current of 5 A and can switch ON at a voltage zero crossing and switch OFF at a current zero crossing. It has low permanent activation current and power.

The central processing module 350, as described above, has the ability to process all required functions. It is a low powered module having permanent non-volatile (NV) storage.

The RF ZigBee transceiver 430 and antenna 440 are fully compatible with the current version of the Owlet Nightshift System and has lower cost but higher range. The Owlet Nightshift System comprises a tele-management system for monitoring, controlling, metering and managing outdoor lighting. It is based on open technologies and saves energy, reduces greenhouse gas emissions, improves outdoor lighting reliability and lowers maintenance cost. In the Owlet Nightshift System, each individual light point can be switched OFF/ON or dimmed at any time. Information relating to operating status, energy consumption and failures of the system can be reported and stored in a database with an exact time stamp and geographical location. The system ensures that the correct and reliable level of lighting is provided on the street with reduced operating costs. Due to its open architecture, the Owlet Nightshift System makes public lighting networks part of the internet thereby enabling web-based applications for the control of such public lighting networks.

The DALI interface 250 provides an output according to IEC 62386 and can support 1 to 4 slaves. The DALI protocol used may be bi-phase 1200 baud so that it appears to be 2400 baud. A transmit frame may be 19 bits (1 start bit, 16 data bits and 2 stop bits) and the receive frame may be 11 bits (1 start bit, 8 data bits and 2 stop bits).

The '0-10V' interface 260 is configured in accordance with EN60929 Annex E for a maximum of 16 clients. In operation, either the DALI interface 250 or the '0-10V' interface 260 is used in accordance with the type of control system, that is, digital or analogue, used to control the dimming functionality of the luminaire (not shown).

The service link 380 operates at 115 kbaud or better. Through the service link interface 390, firmware updates for all components with firmware can be implemented. In addition, full diagnostics can be carried out on the vital functionality of the system whilst allowing fast calibration and providing accessibility after the luminaire controller has been sealed.

The service link 380 may be an infrared (IR) link, for example, IrDA secure wireless link. [IrDA refers to the Infrared Data Association.] In one embodiment, the service link 380 may comprise an IrDA universal synchronous asynchronous receiver/transmitter (USART). Alternatively, the service link 380 may be a RF link, for example, a ZigBee RF link. Irrespective of the type of connection, it is essential that there is no physical connection with the central processing module 350 to maintain galvanic isolation.

A USART is one of the group of universal asynchronous receiver/transmitter (UART) devices that translates data between serial and parallel forms and are commonly used in conjunction with common communications standards, for example, Electronic Industries Association (EIA) RS-232, RS-422 or RS-485. These UART devices generally comprise a clock generator, input and output shift registers, transmit/receive control, and read/write control logic. Optionally, at least one of transmit/receive buffers, a parallel data bus buffer and first-in, first-out (FIFO) buffer memories. The data format and transmission speeds can be configured as required and the actual signalling methods are handled by dedicated driver circuits which are external to the device. Such devices take bytes of data and transmit the data in individual bits sequentially. A further device receives the bits and re-assembles the bits into bytes. As a result, the devices are paired with one at the transmission end and one and the receiving end.

USART devices have both synchronous and asynchronous modes of operation. In synchronous transmission, clock data is separated from the data and no start/stop bits are used so that the transmission is more efficient as more of the bits transmitted comprise usable data. Synchronisation between transmitter and receiver is required in synchronous transmission and the synchronisation is controlled by the transmitter. In asynchronous transmission, no transmission is made over the interconnection between the transmitter and the receiver when the transmitter has nothing to send to the receiver.

In one embodiment of the present invention, the central processing module 350 includes an IR USART device for receiving information from (and transmitting information to) the service link 380 and the service link interface 390. The other end of the service link 380 is connected to another IR USART device for transmitting information to (and for receiving information from) the service link 380. Alternatively, the service link interface 390 may comprise the IR USART device. The IR USART device may form part of a transceiver device connectable to a portable computer-based device.

It will be appreciated that the IR USART system provides galvanic isolation for the central processing module 350 as the isolation is provided by the IR link.

In another embodiment of the present invention, as an alternative to using an IR USART system, ZigBee RF signals can be used in the service link 380 and service link interface 390. Here, the service link interface 390 may comprise a ZigBee RF transceiver. Alternatively, the central processing module 350 may include the ZigBee RF transceiver. In either case, galvanic isolation is provided by the RF connection.

It will readily be appreciated that for flexibility of the luminaire controller 100, the service link interface 390 may be configured to operate using either IR or RF and the central processing module 350 is able to decode either IR or RF data provided to it through the service link 380 via the service link interface 390. Similarly, the central processing module 350 may also be able to encode data for transmission to another device via the service link interface 390 and the service link 380 using either IR or RF.

The selection between '0-10V' or DALI is made during normal configuration of the luminaire controller using a graphic user interface (GUI) connectable to the ZigBee antenna 440 and transceiver 430 and it can be changed at any time when required. For example, a signal over the ZigBee network (illustrated by 450 as described above) may be used to provide a configuration signal to the central processing module 350 which, in turn, provides a selection signal on data transfer line 400 to the isolated supply 230 to select either DALI supply mode or an "external supply" mode where the DALI supply is switched off and '0-10V' supply mode is selected. In the example above, the configuration of the luminaire controller is usually performed after installation on the luminaire as the ZigBee RF link 450 is used for the configuration. However, it will be appreciated that the configuration may be performed before installation using a local GUI if it is known in advance whether the luminaire supports '0-10V' or DALI protocols. If the luminaire supports both, a choice is made in accordance with the requirements of an end user, for example, the power company operating the luminaires and their associated ZigBee RF network.

In addition, the service link 380 can be used to override the configuration and manually select each interface 250, 260 to set manually the dimming levels or to transmit/receive DALI commands for debugging and/or test purposes. For example, the service link 380 may be used to test if there is a ballast/driver present in the luminaire which supports either '0-10V' or DALI protocols or even both protocols. A control signal (not shown) may be transmitted to the service link 380 from a remote GUI (not shown) and passed to the central processing module 350 via the service link interface 390. The selection of DALI interface 250 or the '0-10V' interface 260 is made via data transfer line 400 to the isolated supply 230.

Once the type of interface is selected, the dimming signal 270 is provided to the luminaire via an appropriate connection from the luminaire controller. In one embodiment, the luminaire controller 100 is connected to the luminaire by means of two conductors in a two-conductor cable (not shown). It will be appreciated that two conductors of a multi-conductor cable could also be used. In another embodiment, the connection between the luminaire controller and the luminaire is provided by two connectors. It will be appreciated that the type of connection for providing the dimming signal 270 is dependent on the type of luminaire controller and/or the type of luminaire.

Correct wiring is automatically provided when '0-10V' is selected. This is due to the internal power supply 200 which provides the necessary '+' and '−' relationship. DALI systems can detect polarity and adjust accordingly. In addition, some '0-10V' devices can do the same. In addition, as more than one device can be connected to a luminaire controller, the polarity connection must be determined by the devices. Miswiring protection is not required as a SELV voltage interface is provided which has voltage peak protection.

The luminaire controller in accordance with the present invention can be used with any of the international voltages, namely, 120V, 208V, 240V and 277V for North America, 230V for Europe and other countries. In addition, 110V and 220V may be used in some other parts of the world. The controller also fits with the existing Owlet Nightshift System as described above with a segment controller and a SQL-based user interface.

Ambient light conditions 300 sensed by the photocell 290 in the sensor module 280 provides an output signal indicative of the amount of light sensed which is forwarded to the central processing module 350 for processing. If the output signal is below a predetermined threshold value, then the central processing module 350 provides the dimming signal 270 for the luminaire. Although not shown, the photocell 290 generates an electrical signal which is transferred to the central processing module 350 on data transfer line 360. The electrical signal is converted to signals compatible for the isolated supply 230 so that the dimming signal 270 can be provided in accordance with the interface 250, 260 compatible with the luminaire (not shown).

It will be appreciated that using ZigBee, one luminaire controller in accordance with the present invention can either be used for a single luminaire with which it is associated or with a number of luminaires within the vicinity and which can be controlled over the ZigBee network. In addition, although the invention has been describe using ZigBee networks, any other suitable communication network can be implemented.

The luminaire controller 100 has been described above as having both energy metering and ambient condition sensing modules. However, it will readily be appreciated that the present invention can be utilised in luminaire controllers that do not have these modules and that these modules are not essential features of the invention. In addition, the present invention can also be used with luminaire controllers not having a communications network as programming of the central processing module to select either the DALI or the '0-10V' interface can be performed using the service link 380 operating on a suitable signalling system, for example, an IrDA- or RF-based system, as described above.

The signalling system described above for use with the service link 380 may also be a wireless system, for example, Bluetooth, instead of IR or RF. [Bluetooth is an open wireless technology standard for exchanging data over short distances (using short-wavelength radio transmissions in the industrial, scientific and medical (ISM) bands from 2400 to 2480 MHz) from fixed and mobile devices. Bluetooth can be used to create personal area networks (PANs) with high levels of security. Bluetooth is managed by the Bluetooth Special Interest Group (SIG).]

Although the present invention has been described with reference to specific embodiments, it will be appreciated that other embodiments may be implemented without departing from the scope of the present invention.

The invention claimed is:

1. A luminaire controller connectable to a luminaire, the luminaire controller comprising:
   a main power connection;
   a central processing module; and
   an isolated supply connected to the mains power connection and to the central processing module, the isolated supply being configured for providing dimming signals directly to the luminaire;
   wherein the isolated supply comprises both a digital addressable lighting interface and a '0-10V' interface, and wherein the central processing module is operable to configure one of the digital addressable lighting and '0-10V' interfaces for supplying the dimming signals directly to the luminaire in accordance with a mode of operation of the luminaire.

2. A luminaire controller according to claim 1, further comprising:
   a communications module connected to the central processing module.

3. A luminaire controller according to claim 1, further comprising:
   a service link connected to the central processing module, the service link being adapted to receive signals to at least override the configuration of the digital addressable lighting and '0-10V' interfaces.

4. A luminaire controller according to claim 3, wherein the service link is adapted to select manually one of the digital addressable lighting and '0-10V' interfaces.

5. A luminaire controller according to claim 3, wherein the service link is adapted to set dimming levels manually.

6. A luminaire controller according to claim 3, wherein the service link is adapted to receive system updates.

7. A luminaire controller according to claim 1, further comprising:
   an energy metering module for measuring energy used by at least the luminaire.

8. A luminaire controller according to claim 7, wherein the energy metering module measures energy used by the luminaire controller itself.

9. A luminaire controller according to claim 1, further comprising:
   a sensor module for determining ambient conditions.

10. A system comprising:
    a luminaire; and
    a luminaire controller connected to the luminaire; and
    wherein the luminaire controller comprises:
    a main power connection;
    a central processing module; and
    an isolated supply connected to the main power connection and to the central processing module, the isolated supply comprising both a digital addressable lighting interface and a '0-10V' interface and being configured for providing dimming signals directly to the luminaire; and
    wherein the central processing module is operable to configure one of the digital addressable lighting and '0-10V' interfaces for supplying dimming signals directly to the luminaire in accordance with a mode of operation of the luminaire.

11. A method of configuring a luminaire controller for dimming functionality, the method comprising the steps of:
    supplying a configuration signal to a central processing module of a luminaire controller, wherein the luminaire controller further comprises a main power connection and an isolated supply connected to the main power connection and to the central processing module, the isolated supply including both a digital addressable lighting interface and a '0-10V' interface and being configured for providing dimming signals directly to a luminaire; and
    selecting one of the digital addressable lighting interface and '0-10V' interfaces in accordance with a selection signal from the central processing module.

12. A method according to claim 11, wherein the step of supplying the configuration signal to the central processing module comprises supplying the configuration signal to the central processing module via a communications system.

13. A method according to claim 12, further comprising:
    providing an override signal to the central processing module via a service link so as to at least override a configuration of the digital addressable lighting interface and '0-10V' interfaces.

14. A method according to claim 13, further comprising the step of:
    manually selecting each of the digital addressable lighting interface and '0-10V' interface using the override signal.

15. A method according to claim 13, further comprising the step of:
    manually setting dimming levels of the luminaire controller using the override signal.

16. A method according to claim 13, further comprising the step of:
    providing system updates via the service link.

17. A method according to claim 11, wherein the step of supplying the configuration signal to the central processing module comprises supplying the configuration signal to the central processing module via a service link connected to the central processing module.

18. A method according to claim 11, wherein the steps of supplying the configuration signal to the central processing module and selecting one of the digital addressable lighting interface and '0-10V' interfaces in accordance with the selection signal from the central processing module are performed after installing the luminaire controller on a luminaire.

19. A method according to claim 11, wherein the steps of supplying the configuration signal to the central processing module and selecting one of the digital addressable lighting interface and '0-10V' interfaces in accordance with the selection signal from the central processing module are performed before installing the luminaire controller on a luminaire.

* * * * *